United States Patent
Kirby

(10) Patent No.: US 7,694,150 B1
(45) Date of Patent: Apr. 6, 2010

(54) SYSTEM AND METHODS FOR INTEGRATION OF BEHAVIORAL AND SIGNATURE BASED SECURITY

(75) Inventor: Alan J. Kirby, Hollis, NH (US)

(73) Assignee: Cisco Technology, Inc, San Jose, CA (US)

( * ) Notice: Subject to any disclaimer, the term of this patent is extended or adjusted under 35 U.S.C. 154(b) by 1688 days.

(21) Appl. No.: 10/873,734

(22) Filed: Jun. 22, 2004

(51) Int. Cl.
*G06F 9/00* (2006.01)

(52) U.S. Cl. .................. 713/188; 713/189; 713/194; 713/193

(58) Field of Classification Search .......... 713/189, 713/188, 194, 193
See application file for complete search history.

(56) References Cited

U.S. PATENT DOCUMENTS

| | | | |
|---|---|---|---|
| 6,357,008 B1 | 3/2002 | Nachenberg | 713/200 |
| 6,609,205 B1 | 8/2003 | Bernhard et al. | 713/201 |
| 6,622,150 B1 | 9/2003 | Kouznetsov et al. | 707/200 |
| 6,718,469 B2 | 4/2004 | Pak et al. | 713/200 |
| 6,748,534 B1 | 6/2004 | Gryaznov et al. | 713/188 |
| 6,772,345 B1 | 8/2004 | Shetty | 713/200 |
| 6,785,821 B1 | 8/2004 | Teal | 713/200 |
| 6,792,543 B2 | 9/2004 | Pak et al. | 713/200 |
| 6,792,546 B1 | 9/2004 | Shanklin et al. | 713/201 |
| 6,886,099 B1 | 4/2005 | Smithson et al. | 713/200 |
| 6,892,303 B2 | 5/2005 | Le Pennec et al. | 713/188 |

*Primary Examiner*—Thomas R Peeso

(57) ABSTRACT

Conventional matching approaches to virus detection are ineffective pending deployment of a signature to match a newly discovered virus. In contrast, a behavioral based (subject) approach addresses the so-called "day zero" problem of object matching approaches. An integrated approach combines the behavioral remedy against unknown transmissions with the signature matching of known harmful transmission to provide the reliability and stability of signature based approaches with the real time responsiveness of the behavioral approach. A behavior monitoring module analyzes actions via behavioral heuristics indicative of actions performed by known harmful transmissions. The behavioral monitoring correlates the actions performed to determine an undesirable object. A signature generator computes a realtime signature on the suspect object. The signature generator accumulates successive realtime signatures in this manner for comparison with subsequent incoming transmissions, thus combining the subject based behavioral aspects of virus detection with the deterministic aspects of the object approach.

24 Claims, 11 Drawing Sheets

SYSTEM AND METHODS FOR INTEGRATION OF BEHAVIORAL AND SIGNATURE BASED SECURITY

BACKGROUND

Conventional Anti-Virus (AV) applications attempt to prevent harmful or malicious transmissions such as viruses and worms from infiltrating a computer system. Typically, such applications operate on a network gateway or host and monitor incoming traffic. Host based applications monitor traffic into a particular computer system, or node, while server based applications monitor a physical or logical gateway point such as a firewall or mail server. Server based applications may provide broader protection by consolidating incoming traffic sooner, however may encounter difficulty with end-to-end encrypted transmissions to a host. Host based applications may have access to encrypted and/or obfuscated parts of a message, yet may be limited by the resources that can be devoted to the AV application, such as the ability to provide a large database (DB) of known harmful transmissions.

Conventional AV applications, whether server or host based, however, typically rely on a so-called fingerprint matching implementation. Such a fingerprint matching mechanism aggregates a set of unique indicators, or signatures, exhibited by known malicious transmissions. The unique indicators typically represent portions of files which a particular AV vendor has previously identified as malicious, such as a signature extracted from a particular byte range in the file, or a hash computed over a predetermined portion of a file. The result is a signature value substantially shorter that the entity (file) it represents yet which has a high likelihood of matching a signature computed from another similar instance of the file. A set of signatures of known malicious transmissions is readily comparable to an incoming transmission to determine malicious content in the incoming transmission. Typically, the AV application vendors regularly update and propagate such signature lists to subscribers to maintain the AV application against newly developed viruses and worms.

SUMMARY

In a conventional AV application, vendors propagate updated signature lists to users (subscribers) on a regular basis to maintain currency of the signature lists against evolving malicious transmissions such as newly developed viruses and worms. Vendors must therefore identify emerging malicious transmissions, also known as "malware" by those of skill in the art, and develop corresponding signatures in order to maintain the effectiveness of the protection afforded by the AV application. However, such an AV application relies on a repository of known malware. The conventional AV vendor first identifies and analyzes newly discovered malware before developing and propagating the malware signature to the repository. Accordingly, propagation of virus signature updates involves detection and analysis by the vendor prior to shipment or transmission to the user site of the update for deployment within client computers. Accordingly, development and dissemination of such virus updates imposes a time lag from virus inception until effective shielding via the conventional AV approach.

Therefore, the conventional AV applications may tend to suffer from the so-called "day zero" problem. A typical new virus enjoys unhindered propagation on inception (day zero) until an AV application vendor develops a corresponding signature and deploys the new signature to users. In other words, conventional signature based AV applications may be blind to new viruses pending the signature deployment lag time common to such conventional AV applications. Therefore, while the conventional signature based detection approach tends to achieve a high degree of accuracy in matching known undesirable transmissions and few false positives, a potential window of vulnerability may exist at the onset of a new virus.

An example may illustrate. A hypothetical bank robber application performs graphical matching of captured images to a database of known bank robbers. Captured images obtainable from security cameras typically installed in a bank allow the bank robber application to quickly and accurately match arrivals of known bank robbers by matching the stored images. While such a matching system achieves high accuracy with few false positives for known robbers, a bank robber that is "new guy" is afforded free reign on the first bank encountered. Further, the new guy may be able to infiltrate several other banks before a corresponding image may be captured from the first bank and propagated to the image database employed by the successive banks.

Embodiments of the invention provide a behavioral approach to virus detection and processing of other malicious processing activity, that in contrast to conventional techniques, exhibits a substantial departure from the conventional day zero problem. The behavioral approach provided by embodiments of the invention focuses on the subject actor of suspect operations, such as the process writing or executing a file, rather than the object of the suspect activity such as the infected file. Therefore, the behavioral approach analyzes the actions performed and the provenance of the data used, and determines whether an attempted activity is indicative of suspect activity. Further, one likely outcome of detecting and possibly preventing such suspect activity is the identification of an object or entity, such as a file, that is very likely the method of conveyance of the malicious code or instructions, or "malware" to those of skill in the art. While the identification of a malware-containing object might be considered an incidental side-effect of heuristically detecting and/or preventing malicious or undesirable activity, configurations of the invention employ such behavioral based identification of the malware for successive signature based identification, as discussed herein.

Therefore, conventional virus detection implementations employ a signature based approach which focuses on the content of an alleged malware object, and matching the signature of a newly arrived object against a list of known malware signatures. The behavioral approach, in contrast, focuses on the actions of a subject, irrespective of the alleged malware object which the actions may affect or manipulate. Configuration of the invention are based, in part, on the observation that, in addition to mitigating the day zero problem, integrating and applying both the behavioral and signature approaches identifies and prevents malicious activity which may elude either the signature approach or the behavioral approach alone.

The presently claimed invention substantially overcomes the above described shortcomings of the signature approach alone by providing an integrated approach which applies features of both the behavioral and signature approach in a parallel and complementary manner to strengthen and reinforce the level of virus protection provided by either approach alone. Malware objects, generally identifiable from a successful behavioral identification of undesirable activity, are quarantined. Such malware objects, identified by the behavioral heuristic, are accumulated along with the known malware content and corresponding signatures. Therefore, a signature based repository of malware signatures, obtained from both conventional signature methods and from heuristically identified malware objects, provides early detection of entities including known malware content, while the behavioral heuristic continues to provide protection against previously undiscovered viruses, thus mitigating the above described day zero problem.

The behavioral heuristic identifies actions known to be common to undesirable activity, rather than the content of an alleged object. Since a set of identifiably harmful actions is applicable to many objects (e.g. files) upon which the harmful actions are performed, the behavioral approach is broader then the signature approach, since a heuristic that is sensitive to a set of "bad" actions is operable to identify multiple viruses. Accordingly, the behavioral approach is not burdened with developing a matching counterpart (e.g. signature) to each occurrence of a new virus since the actions performed by a new virus may nonetheless correspond to a pattern of known malicious activity. One particular exemplary behavioral approach is exhibited by the Cisco Security Agent (CSA) and related products, marketed commercially by Cisco Systems, Inc., of San Jose, Calif.

The behavioral heuristic, as employed herein, may be viewed as a set or rules which identify potentially harmful or undesirable actions. Such a heuristic, in the exemplary configuration, in embodied in a software entity or program operable to identify the undesirable activity based on the actions observed. Such actions, as described in the example above, need not necessarily imply a set of steps or a sequence, but rather collections of actions and objects acted upon which collectively correspond to actions which are either common to malicious activity, deviant from normal or expected activity, or both. Alternative implementations and extensions to the software embodied heuristic may be employed, such as a knowledge base query or statistical compilation of access patterns.

The invention is based, in part, on the observation that conventional methods of detection of undesirable transmissions, such as viruses and worms, tend to be based on object matching approaches which may be ineffective during a lag time pending development and deployment of a triggering match (e.g. signature) to combat a newly discovered virus. The signature approach and the behavioral heuristic approach each have strengths which combine to form a highly effective virus prevention mechanism. Signature approaches have high reliability and low occurrences of false negatives, once the signature is computed and implemented. Conversely, the behavioral approach is immediately effective against "new viruses (e.g. the "day zero" problem), however may allow minor propagation of an undesirable transmission until the actions are identified as harmful. Accordingly, it would be beneficial to provide an integrated behavioral based (subject) and signature based (object) approach which addresses the day zero problem of object matching approaches, and which combines the behavioral remedy against unknown transmissions with the signature matching of known harmful transmission to provide the reliability and stability of signature based approaches with the real time responsiveness of the subject (action, or step) based approach.

Configurations of the invention substantially overcome the above described shortcomings of conventional virus detection by a security agent that provides an integrated approach which combines the subject based behavioral aspects of virus detection with the deterministic aspects of the signature (object content) based approach. In a particular exemplary configuration discussed below, a behavior monitoring module analyzes actions, or operations, performed with respect to a new object, for example an incoming communication (transmission), such as an email. The behavior monitoring module invokes a behavioral heuristics, such as a rule set, indicative of actions performed by known harmful transmissions. The behavioral heuristic monitors (and can control) actions performed with respect to the other objects as a result of the incoming object or entity. Further, if the heuristic concludes that malicious activity is being attempted, the heuristic can often identify the object that is the conveyance of the malware.

A signature generator, such as a hash engine, then computes a realtime signature, such as a hash, on the suspect object. The realtime signature is written to a signature database for comparison with future suspect objects in incoming transmissions. The signature generator accumulates successive realtime signatures in this manner for comparison with subsequent incoming transmissions.

Such a suspect object triggers both the behavioral and signature checks, which may be performed in parallel or in sequence. If, for example, the signature (object) comparator evaluates a content based check against previously stored realtime signatures in the signature database as benign, then the behavior heuristic in the behavior monitor evaluates the incoming object may nonetheless indicate a correlation with harmful actions. As indicated above, both checks occur as ongoing processes in an operational system. Accordingly, if either the behavioral monitor or the object comparator indicate an undesirable transmission, then the security agent rejects the transmission as malign. In this manner, the security agent performs an integrated behavioral and signature based evaluation of a suspect transmission which mitigates the day zero problem and includes the early detection accuracy of object based pattern matching analysis against predetermined malicious transmissions.

In further detail, the integrated method for detecting undesirable activity in an information processing environment in accordance with one embodiment of the invention includes enumerating a set of behavioral actions indicative of suspect behavior, such as a rule policy identifying a set of suspect actions, and comparing the identified operations with the suspicious behavioral activity. A computer system equipped with the invention can maintain the behavioral actions indicative of suspect behavior (e.g., in a database of processing actions that if performed, would be suspected to cause problems within the computer from a security perspective).

If the detected operations correspond to the behavioral actions, the security agent identifies the detected operations as undesirable activity, and computes a signature indicative of the detected undesirable activity. A signature generator, such as a hash engine, computes the signature from a corresponding object, such as a virus file, in which the signature is operable to indicate subsequent undesirable activity. Accordingly, as the computer system operates, it may detect a sequence of actions that a suspect process is attempting to perform on an object (e.g., any resource, data structure, registry file, etc.) within the computer system (e.g., within the operating system) during operation of the suspect process. Once detected, the identified object, or malware object, is quarantined, meaning that it is restricted from read or execute access such that it mat not perform undesirable actions.

In an exemplary scenario, the detected sequence of actions correspond to the behavioral actions indicative of suspect behavior, as concluded by the behavioral heuristic. In response to detecting the actions performed by the suspect process on the subsequent object that correspond to the suspicious behavioral actions, embodiments of the invention infer that the suspect process is performing undesirable activity within the computer system and are operable to prevent the suspect process from further performing the sequence of operations, thus preventing malicious or undesirable activity within a computer system. The embodiment is further operable to create a signature of the malware object, in real time, and to disseminate this signature to other embodiments of the invention operating on other computer systems, such as those on nearby computers in a local area network, to quickly prevent the malicious process (that may have been also transmitted to other local machines in the very recent past) from operating on other machines.

Such an embodiment thus prevents the malicious process from operating to propagate to other machines and does so without requiring those other machines to detect the sequence of operations matching the behavioral actions indicative of suspect behavior, therefore preventing access to objects which contain malware, in addition to saving processing resources on those other machines (since they can simply use the signature received in real time). Since the detection and dissemination is done in real time and is done locally between computer systems nearby each other, the chances are high that a suspect process that attempts rampant dissemination within, for example, a local area network, is quickly thwarted by embodiments of the invention. In other words, embodiments of the invention reduce the day zero time window down to a very small fraction of time for those systems which are without behavioral protection.

The integrated test, therefore, operates by detecting operations performed on a subsequent object, in which the operations are indicative of suspect behavior and does not rely on having to receive a specific signature. In one embodiment, the integrated test performs both a signature check and a behavior check. Accordingly, the security agent computes a signature on the subsequent object and compares the computed signature with the previously computed signatures indicative of undesirable activity. The security agent also compares the detected operations with the suspicious actions. If at least one of the computed signature and the detected operations are indicative of undesirable activity, the security agent identifies the detected operations and the computed signature as undesirable activity. Note that, as indicated above, the behavioral and signature aspects may occur independently and simultaneously, a signature match is generally performable as a discrete operation on a newly arrived object, while the behavioral aspect may span longer periods of time until a particular pattern of behavior is deemed to correspond to known malicious activity. More specifically, the behavioral heuristic performs according to a set of rules, rather than a discrete check at a point in time. For example, an incoming email attachment file may be deemed as "untrusted." A process reading the file and writing another file creates another untrusted file. A subsequent attempt to execute the file may constitute malicious behavior. In other words, any process or file which "touches" an untrusted file may "inherit" an untrustworthy trait, which may then be passed on until the pattern indicates a correspondence with undesirable, and hence, preventable, behavior.

Accordingly, the order of the signature check and behavior check as discussed herein is exemplary. The security agent then adds the computed signature to the previously computed signatures for use with successive objects. Further, since the behavior checks are typically less granular and more broadly applicable, they tend to have a substantially longer longevity than matching checks and therefore need not be updated upon each detection in order to maintain effectiveness.

The computed signatures, in the particular exemplary arrangement, are stored in a signature database for use with successive transactions. Accordingly, the security agent accumulates each of the computed signatures as a set of signatures indicative of undesirable activity. Further, the security agent may merge the set of signatures with an external signature set, such as an AV product or database from an external vendor, also indicative of undesirable activity, in which the merged set is operable as a uniform repository of signatures. Therefore, the set of signatures may include signatures generated from predetermined mathematical computations on at least a portion of the object, and the external signature set may include signatures generated from positional range and value determinations of predetermined patterns in an object.

In a particular arrangement, accumulation of the signatures further includes integrating the computed signatures with a repository such as an external AV database, in which the AV database is operable to store signatures computed via a plurality of computational methods. Such a repository may be a vendor supplied database of known signatures, such as a library deliverable with a virus detection application, wherein the repository is an A/V database operable to store signatures and a corresponding signature computation method.

Therefore, in a particular exemplary configuration, the security agent accumulates the computed signatures to build a set of determined signatures, in which the set of determined signatures is adapted for comparison with objects of subsequent suspect operations. The security agent applies both the behavioral test and the signature test to subsequent transactions (communications) exhibiting suspect operations, and identifies the entire transaction as undesirable if the signature test of the object or the behavioral test on the operations is indicative of suspect behavior.

In alternate configurations, a plurality of undesirable transaction tests may be integrated, in addition to the exemplary behavioral and signature checks discussed herein. An approach suitable for use with the present claims integrates such tests to provide an integrated test (check) stronger that either test alone. Further, as with the accumulated realtime signature repository herein, the results of previous tests are aggregated for successive transactions, building a stronger test baseline over time in an automated manner. As illustrated above, such an aggregation involves the combination of the vendor supplied AV database with the realtime signatures aggregated in the repository.

Alternate configurations of the invention include a multi-programming or multiprocessing computerized device such as a workstation, handheld or laptop computer or dedicated computing device or the like configured with software and/or circuitry (e.g., a processor as summarized above) to process any or all of the method operations disclosed herein as embodiments of the invention. One such embodiment comprises a computer program product that has a computer-readable medium including computer program logic encoded thereon that, when performed in a multiprocessing computerized device having a coupling of a memory and a processor, programs the processor to perform the operations disclosed herein as embodiments of the invention to carry out data access requests. Such arrangements of the invention are typically provided as software, code and/or other data (e.g., data structures) arranged or encoded on a computer readable medium such as an optical medium (e.g., CD-ROM), floppy or hard disk or other medium such as firmware or microcode in one or more ROM or RAM or PROM chips, Field Programmable Gate Arrays (FPGAs) or as an Application Specific Integrated Circuit (ASIC). The software or firmware or other such configurations can be installed onto the computerized device (e.g., during operating system for execution environment installation) to cause the computerized device to perform the techniques explained herein as embodiments of the invention.

BRIEF DESCRIPTION OF THE DRAWINGS

The foregoing and other objects, features and advantages of the invention will be apparent from the following more particular description of embodiments of the invention, as illustrated in the accompanying drawings and figures in which like reference characters refer to the same parts throughout the different views. The drawings are not necessarily to scale, with emphasis instead being placed upon illustrating the embodiments, principles and concepts of the invention.

DETAILED DESCRIPTION

Conventional virus detection mechanisms are typically based on object matching approaches which may be ineffective during a lag time pending development and deployment of a triggering match (e.g. signature) to combat a newly discovered virus. Accordingly, it would be beneficial to combine a behavioral based (subject) approach which addresses the day zero problem of object matching approaches, with the signature matching of known harmful transmissions, to provide the reliability and stability of object (signature) based approaches with the real time responsiveness of the subject (action) based approach.

Embodiments of the invention provide mechanisms and techniques that implement an integrated approach which combines the subject based behavioral aspects of virus detection with the deterministic aspects of the signature based approach. In a particular exemplary configuration discussed below, a behavior monitoring module analyzes actions, or operations, performed with respect to an incoming communication (transmission), such as an email. The behavior monitoring module invokes a behavioral heuristic indicative of actions known to be harmful or undesirable. The behavioral monitoring module employs the behavioral heuristic to identify and analyze the actions (operations) performed with respect to the incoming object, and, if a correspondence is found, the suspect object which is likely the conveyance of the malware is determined to be undesirable. A signature generator, such as a hash engine, then computes a realtime signature, such as a hash, on the suspect object. The realtime signature is written to a signature database for comparison with future suspect objects in incoming transmissions. The signature generator therefore accumulates a baseline of realtime signatures for comparison with subsequent incoming transmissions.

Embodiments of the invention significantly enhance performance of virus detection mechanisms because of the integration of the behavioral and signature approaches. If the pattern matcher concludes that a content based check against the baseline of previously stored realtime signatures in the signature database indicates a benign transmission, then the behavior monitor evaluates the actions performed by, on behalf of, or as a result of the incoming transmission, based on the operations exhibited. Accordingly, if either the behavior monitor or the pattern matcher indicates an undesirable transmission, then the security agent rejects and quarantines the transmission as malign. In this manner, the security agent performs an integrated behavioral and signature based evaluation of a suspect transmission which mitigates the day zero problem and includes the accuracy and early detection of object based pattern matching analysis against predetermined malicious transmissions.

Figure 1:
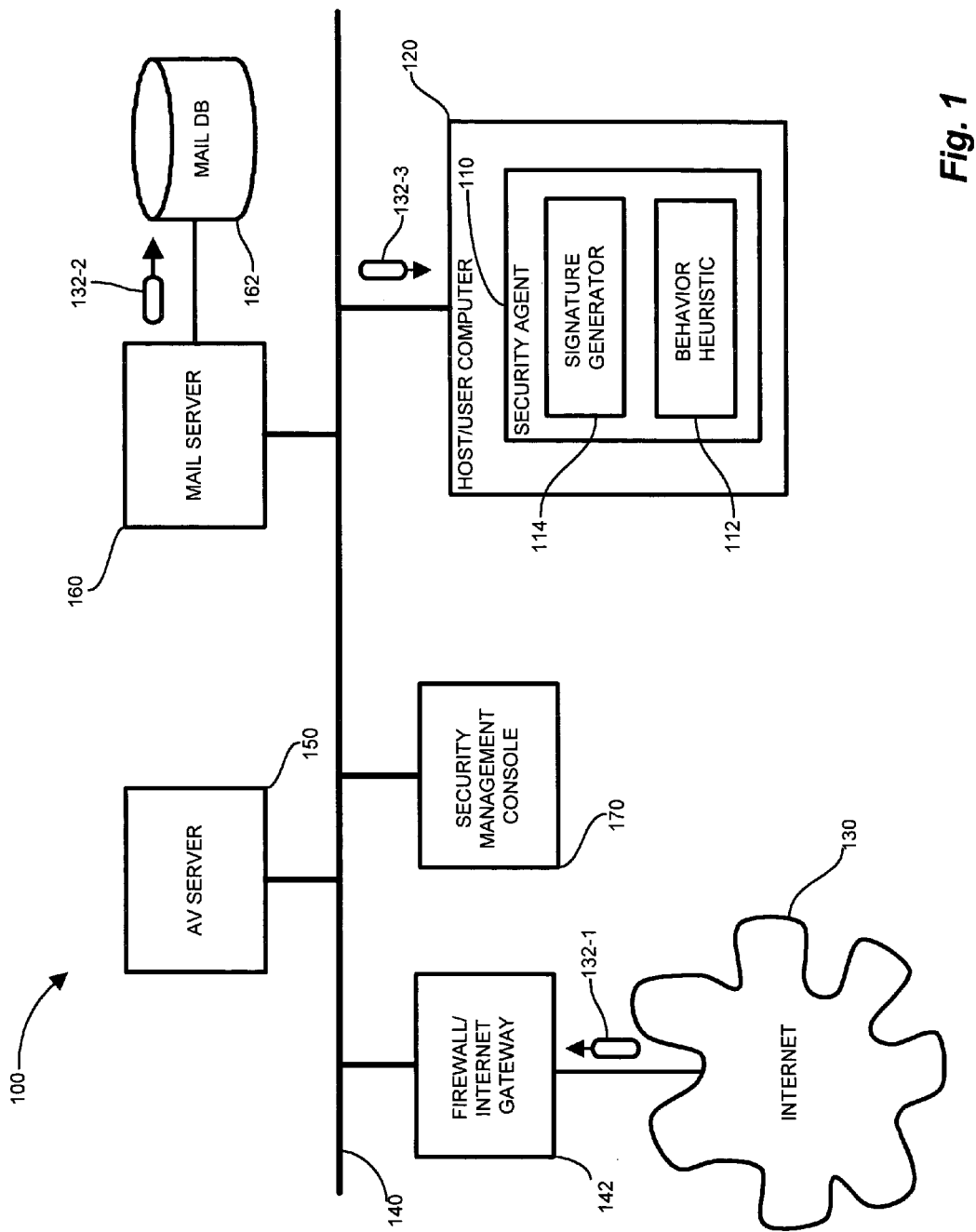
FIG. 1 is a context diagram of an information processing environment suitable for use with configurations of the invention.

FIG. 1 is a context diagram of an information processing environment 100 suitable for use with configurations of the invention. Referring to FIG. 1, the environment 100 includes one or more security agents 110 on a host computer 120. The host computer 120 couples to a public access network such as the Internet 130 via a local interconnection 140 such as a local area network (LAN) and a local physical or logical access point (e.g. firewall) 142 or other Internet connection or gateway. The LAN 140 also couples an AV server 150, a mail server 160, and a security master console (MC) 170. Further, the master console 170 couples to a signature repository 172 for manipulating signature and hash results, discussed further below.

In operation, as indicated above, the security agent 110 performs a multi tiered inquiry for identifying undesirable transmissions. The undesirable transmissions, as disclosed herein, include malicious communications, typically email based, such as viruses and worms, but may extend to other communications which may cause harmful, annoying, or inefficient operation such as excessive unsolicited email (SPAM), for example.

A particular tier includes a behavioral based, subject approach which focuses on the actions of a process or thread performing the behavior associated with an alleged undesirable communication. Another tier includes an object based matching approach which focuses on the content of a subject of the behavior, typically a file or port, and usually includes signature or fingerprint matching on the alleged malicious object (e.g. file). Accordingly, the security agent 110 employs one or more behavior heuristics 112 enumerating actions indicative of undesirable transmissions. The security agent 110 also includes a signature generator 114, such as a hash engine, for producing a signature or fingerprint corresponding to an object indicative of an undesirable transmission, such as a file containing a virus. The exemplary configuration discussed herein includes an integrated two tiered approach (subject and object), although alternate configurations employ multiple tiers. The integration of two or more mechanisms, as disclosed herein, results in a stronger, more accurate determination of undesirable transmissions than either of the tiers is likely to yield alone.

For example, a particular pattern of some typical viruses is to store and execute itself via an email message, typically in an attachment which may be executed upon opening. Accordingly, a corresponding behavioral heuristic 112 may be the actions of 1) receiving an email attachment from an external network 132-1 2) writing (storing) the email attachment on behalf of the recipient 132-2; and 3) executing the same stored email attachment on the recipient (i.e. host) node 132-3. Occurrence of the actions of the transaction 132-1.132-3 by an email process, or subject, matching the heuristic trigger the behavioral (subject) tier of the undesirable transmission check.

The exemplary environment 100 also include a mail server 160 having a mail database 162 for storing email messages, frequently the vehicle by which undesirable transmissions arrive. An AV server 150 couples to an AV database 152 for storing the aforementioned vendor supplied anti virus (AV) signatures.

Figure 2:
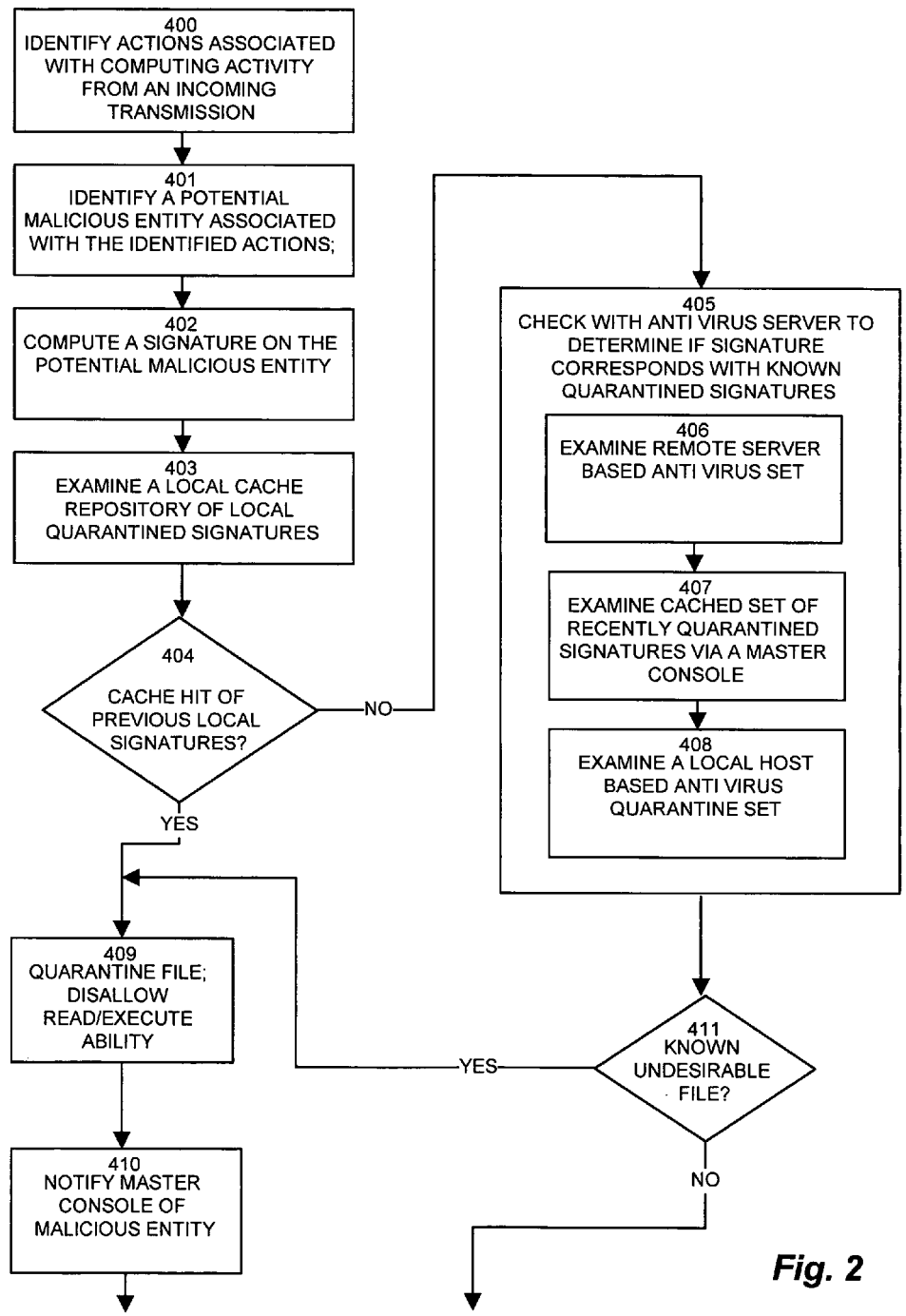
FIGS. 2 and 3 depict an exemplary arrangement according to several configurations of anti-virus (AV) servers and behavioral heuristics in an integrated approach, suitable for use with the present invention.
Figure 3:
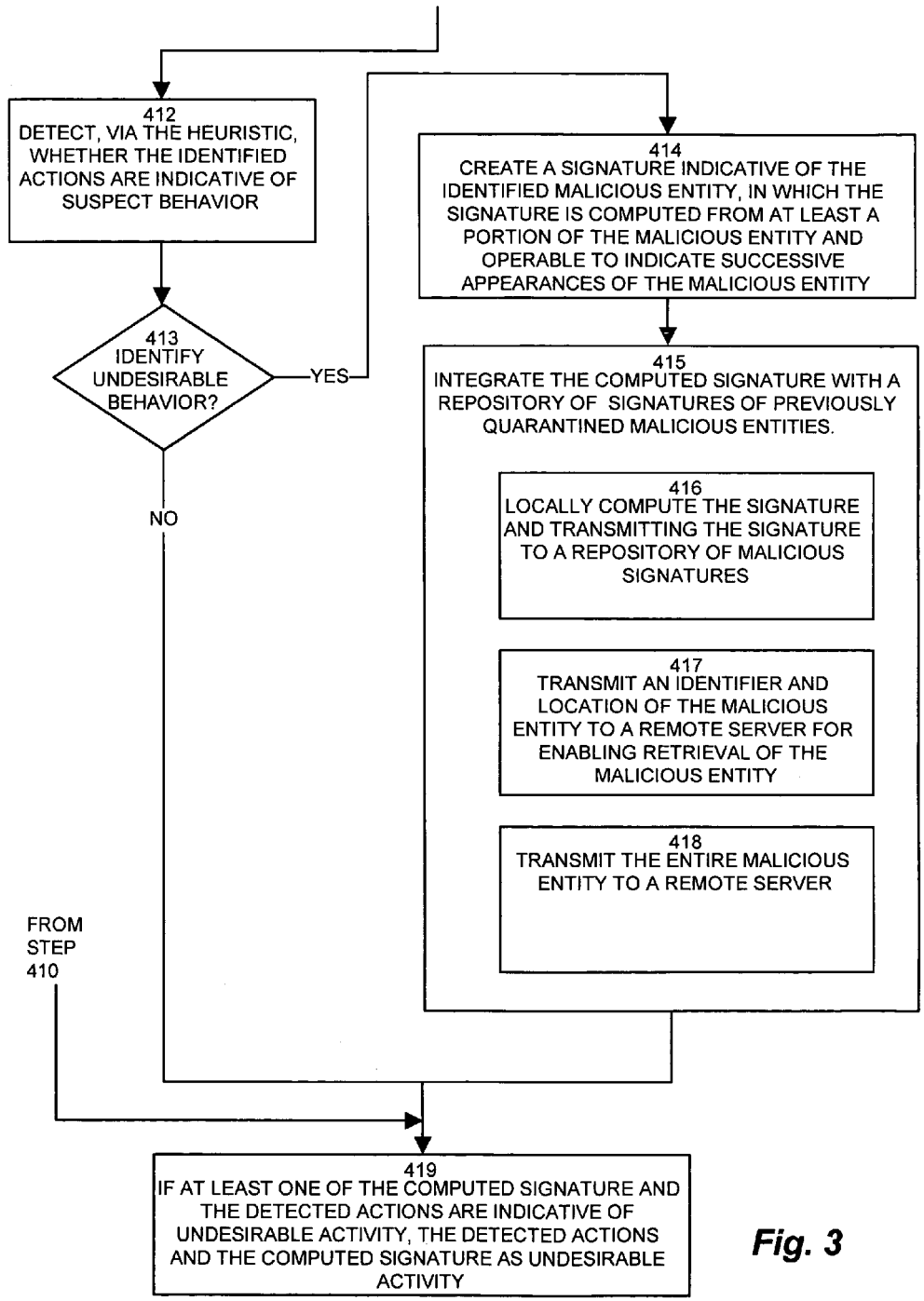

FIGS. 2 and 3 depict a flowchart of an exemplary arrangement according to several configurations of anti-virus (AV) servers and behavioral heuristics in an integrated approach. Alternate arrangements of network interconnections may be apparent to those of skill in the art without deviating from the principals of the invention as claimed herein. Referring to FIGS. 1-3, the method for detecting undesirable activity in an information processing environment as disclosed herein includes identifying actions associated with computing activity from an incoming transmission, as depicted at step 400. An incoming transmission is typically the receipt of a network based packet or ser or packets, such as an email message, but may also be other mechanisms by which a new object is detected on the local system or environment 100.

The detected actions are used to identify a potential malicious entity associated with the identified actions, such as an attachment to the email file, as shown at step 401. The integrated approach discussed herein includes, as depicted above, both a behavioral, or action based check, and a signature, or object content based check. This integrated approach may occur in parallel, however is discussed herein as a series of exemplary steps for illustrative purposes.

For the content based check on the object, the signature generator 114 computes a signature on the potential malicious entity, or object, as depicted at step 402, and examines a local cache, such as a repository of local quarantined signatures, as shown at step 403. A check is performed at step 404 to determine if the local cache, which may correspond to malware objects previously discovered locally by the behavioral heuristic 112, results in a cache hit on one of the previously created signatures indicative of a malicious entity, the object is quarantined, as shown at step 409.

If the local cache check passes, then the agent 110 checks with the AV server 150 to determine if the object corresponds with known quarantined (i.e. malware) signatures, as shown at step 405. Depending on the configuration of the environment 100, such as the proximity of the AV server and whether the AV mechanism is host based or server based, one of several checks may be performed. Accordingly, examining the computed signature set of the AV server may include examining a remote server based anti virus set, as depicted at step 406, a cached set of recently quarantined signatures via the master console 170, as shown at step 407, or a local host based anti virus quarantine set, as shown at step 408. If any of the checks at steps 406-408 indicate the presence of a known undesirable file (e.g. malware) as identified by the check at step 411, then the object is quarantined, as shown at step 409, and the master console 170 notified of the malicious malware entity, as depicted at step 410.

In sequence or in parallel with the signature (e.g. object content) check above, the behavior heuristic 112 is applied to the identified actions. The behavior heuristic 112, as described above, involves enumerating a set of behavioral actions indicative of suspect behavior, and developing a heuristic operable to identify subsequent occurrences of the suspicious actions in the information processing environment. The security agent 110 then employs the developed heuristic 112 for identifying corresponding suspect behavior. Accordingly, if the heuristic 112 identifies suspect behavior, as depicted at step 412, the security agent 110 determines the malicious entity associated with the identified suspect behavior, as shown at the check at step 413. If the behavioral heuristic detects undesirable behavior, then the agent 110 creates a signature indicative of the identified malicious entity, in which the signature computed from at least a portion of the malicious entity and operable to indicate successive appearances of the malicious entity, as depicted at step 414. This signature responsive to the behavioral check may be the same signature generated on the alleged malicious entity from the signature check, at step 402 above, or may represent a separate signature generation, depending on the signature mechanism employed locally and by the AV server 150. In either case, the heuristically triggered signature is integrated with a repository of signatures of previously quarantined malicious entities, as depicted at step 415.

Integration of the behavioral and signature methods may occur according to one or more configurations, depending on the arrangement of the AV server. In general, the security agent 110 accumulates the newly computed signature as a set of signatures indicative of undesirable activity by adding the computed signature to the previously computed signatures. Accordingly, accumulating the set of signatures invokes one or more of several operations. Accumulating the signatures may further include locally computing the signature and transmitting the signature to a repository of malicious signatures, as depicted at step 416, or transmitting an identifier and location of the malicious entity to a remote server for enabling retrieval of the malicious entity, as shown at step 417, or transmitting the entire malicious entity to a remote server, as depicted at step 418. Depending on the outcome of the integrated behavioral (e.g. step 413) and signature (e.g. step 404 and 411) checks discussed above, the security agent 110 therefore identifies, if at least one of the computed signature (i.e. object content test) and the detected operations (i.e. behavioral heuristic) are indicative of undesirable activity, the detected operations and the computed signature as undesirable activity, as depicted at step 419.

Figure 4:
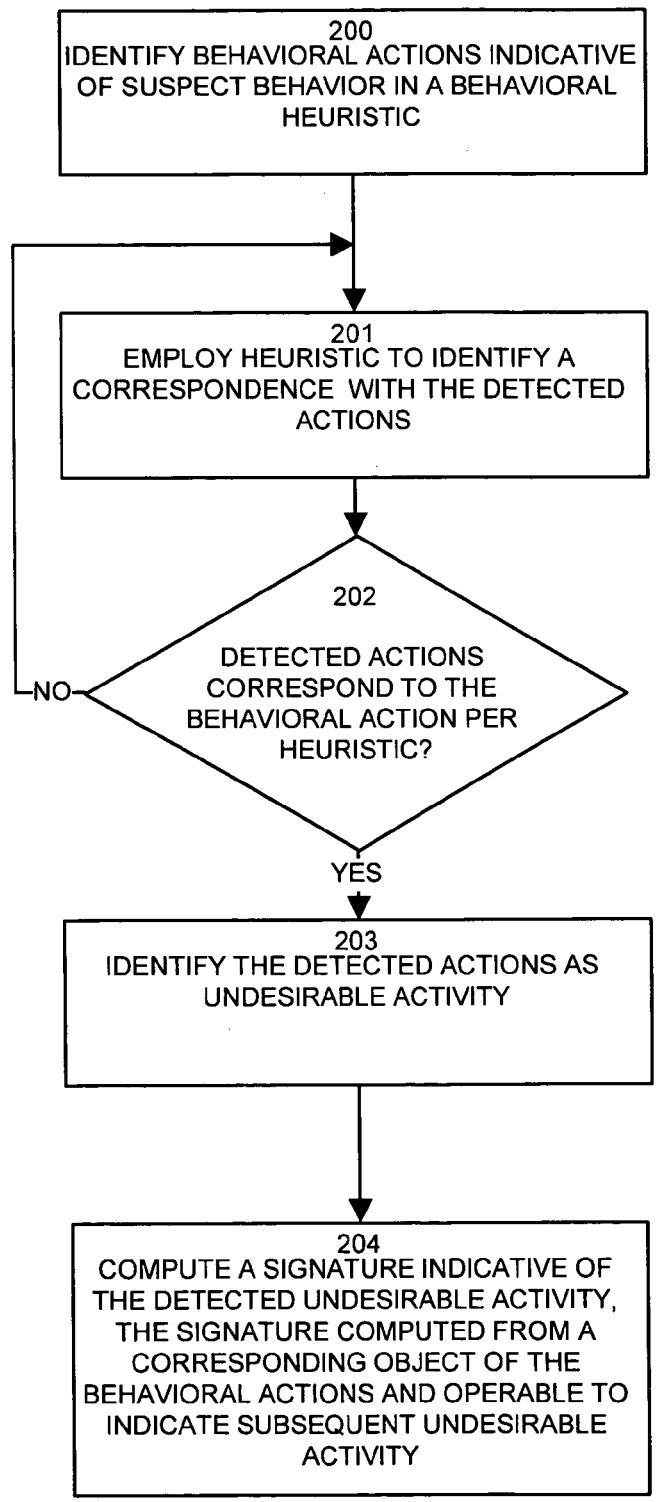
FIG. 4 is a flowchart of an exemplary configuration of the invention in the environment of FIG. 1.

FIG. 4 is a flowchart of an exemplary configuration of the invention in the environment of FIG. 1. Continuing the example in further detail with respect to FIG. 4, the method for detecting undesirable activity in an information processing environment includes enumerating a set of behavioral actions indicative of suspect behavior in a behavior heuristic 112, as depicted at step 200. As indicated above, the heuristic is a set of actions based on actions taken by a subject, such as a process or thread, rather than a check pertaining to the content of a file. The security agent 110 employs the heuristic to identify a correspondence with the detected actions or operations 112, as depicted at step 201. Since the behavioral actions 132-1.132-3 are indicative of types of attacks (e.g. emailed virus), rather than instances (one of many virus files), the actions are typically common to multiple different undesirable transmissions. Accordingly, such a heuristic 112 has a greater longevity than a specific content signature test since a different instance of an attack will still trigger the heuristic 112.

A check is performed, at step 202, to determine if the detected actions correspond to the suspicious behavioral actions of the behavior heuristic 112. Note that the behavior heuristic 112, in the exemplary configuration, may include a set of known heuristic patterns which are compared in an iterative manner. Such an aggregation is discussed further below with respect to a rule policy (FIG. 3, 174).

If the check at step 202 indicates a match, the security agent 110 identifies the detected operations as undesirable activity, as shown at step 203. Since the detected actions are indicative of undesirable activity, it is likely that the object 132-1 of the transaction (e.g. file) concerned is also undesirable. Accordingly, such an object 132 may also be deterministic of an undesirable transmission for future communications. Therefore, the signature generator 114 computes a signature indicative of the detected undesirable activity, in which the signature is computed from a corresponding object 132 (e.g. received attachment file) of the behavioral actions, in which the object 132-1 is deemed operable to indicate subsequent undesirable activity, as depicted at step 204.

Figure 5:
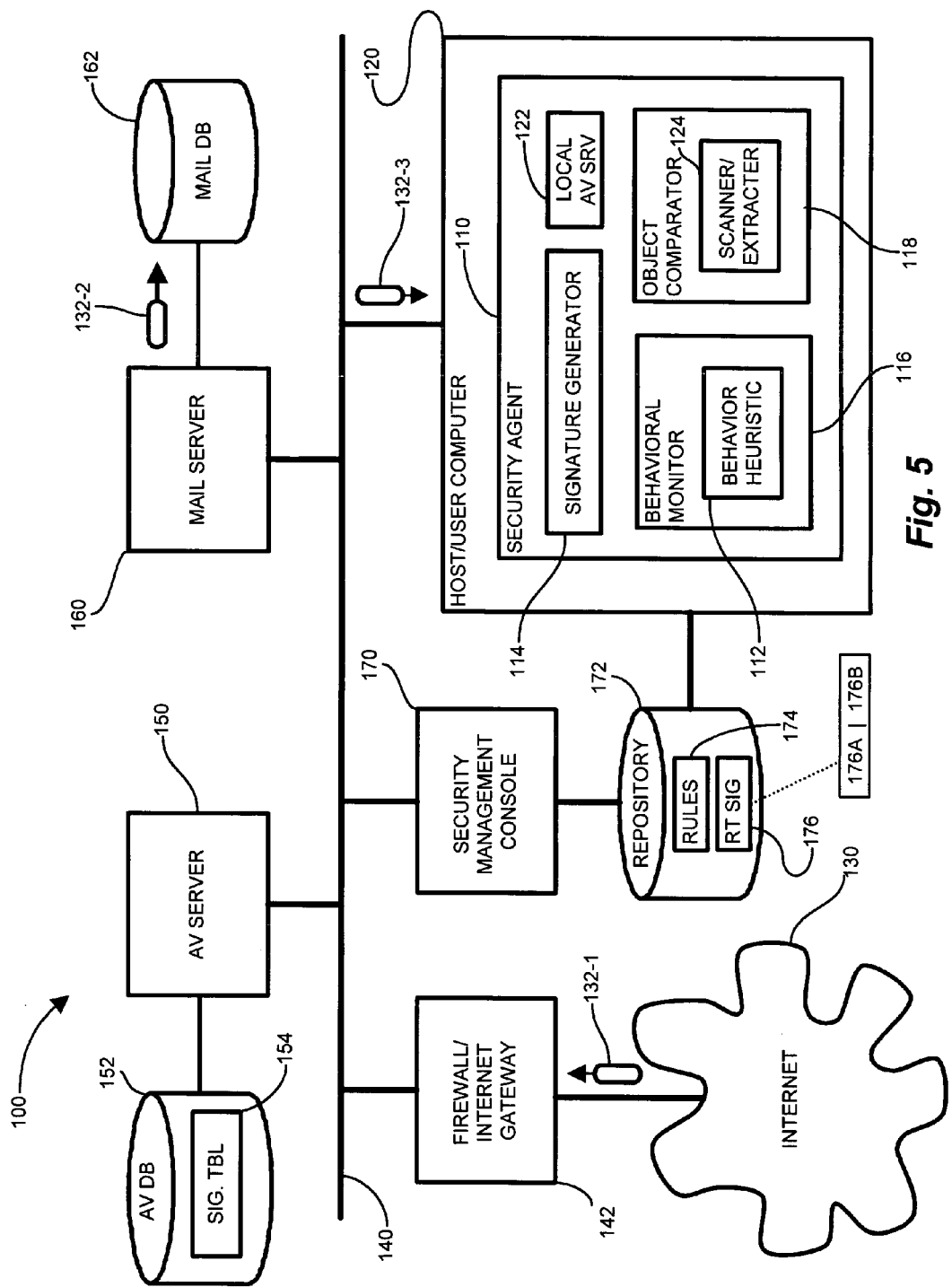
FIG. 5 is a block diagram of the security agent in the environment of FIG. 1 in further detail.
Figure 6:
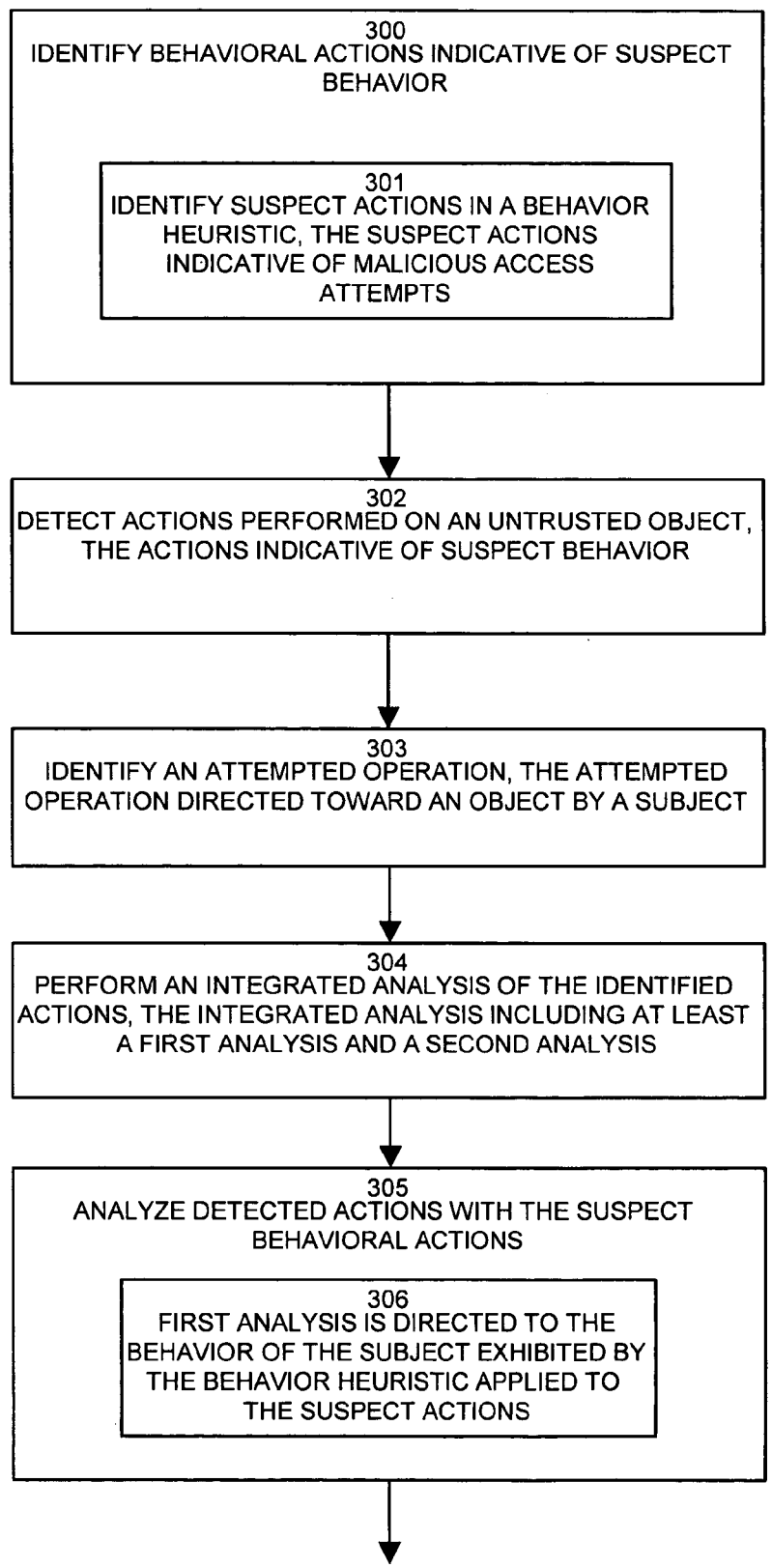
FIGS. 6-9 are a flowchart for identifying undesirable transmissions by employing the security agent of FIG. 5.
Figure 7:
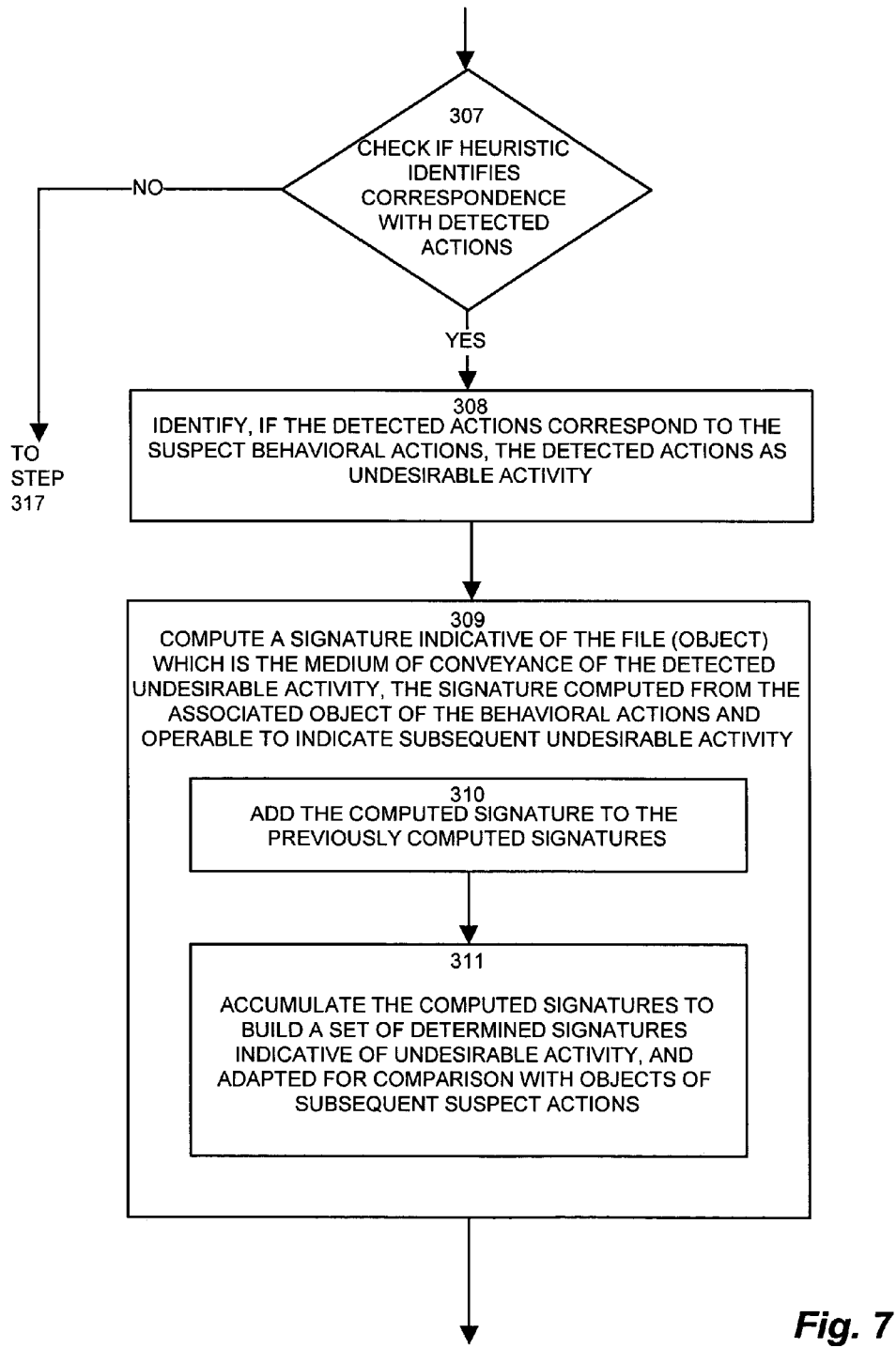
Figure 8:
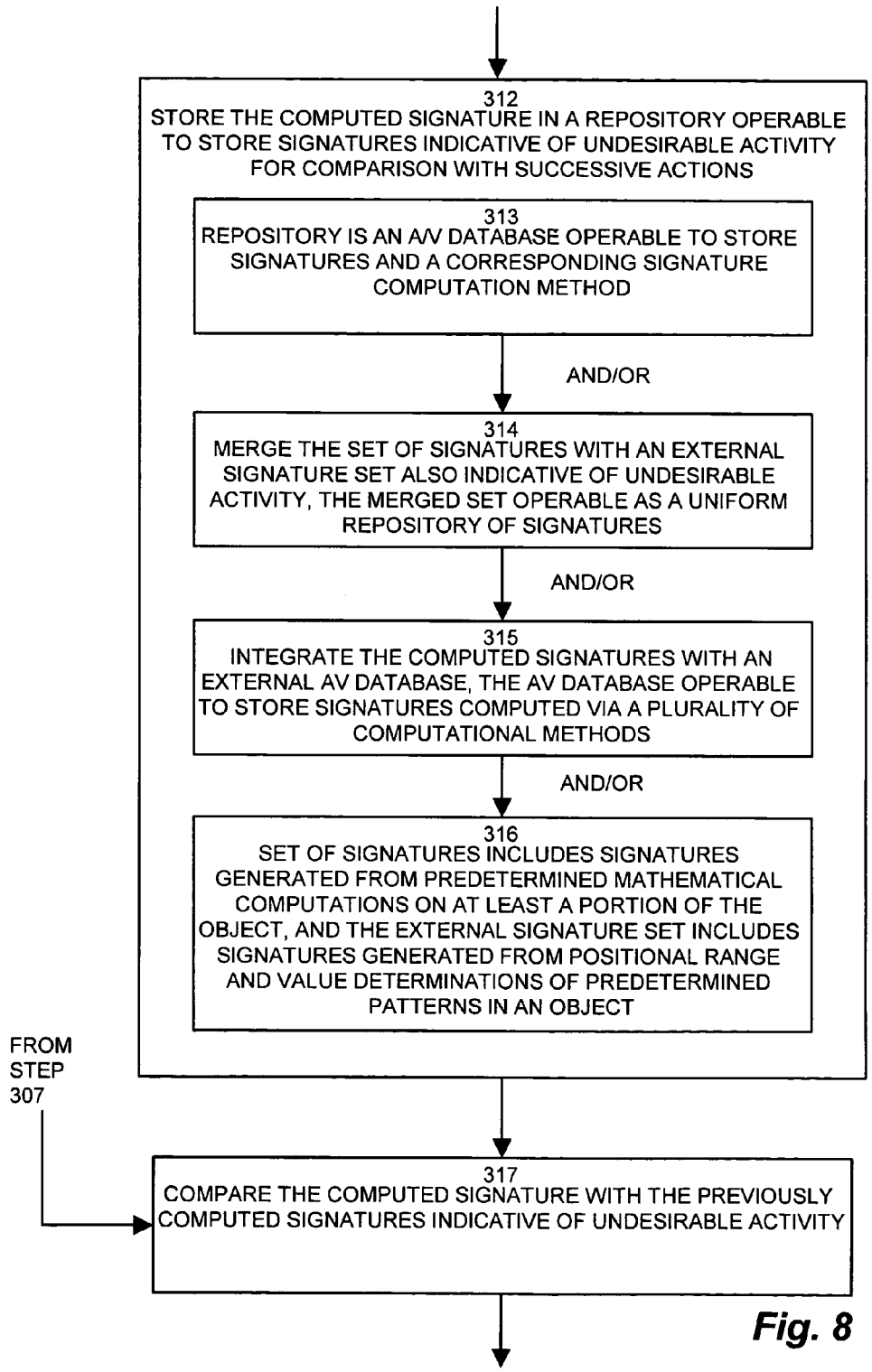
Figure 9:
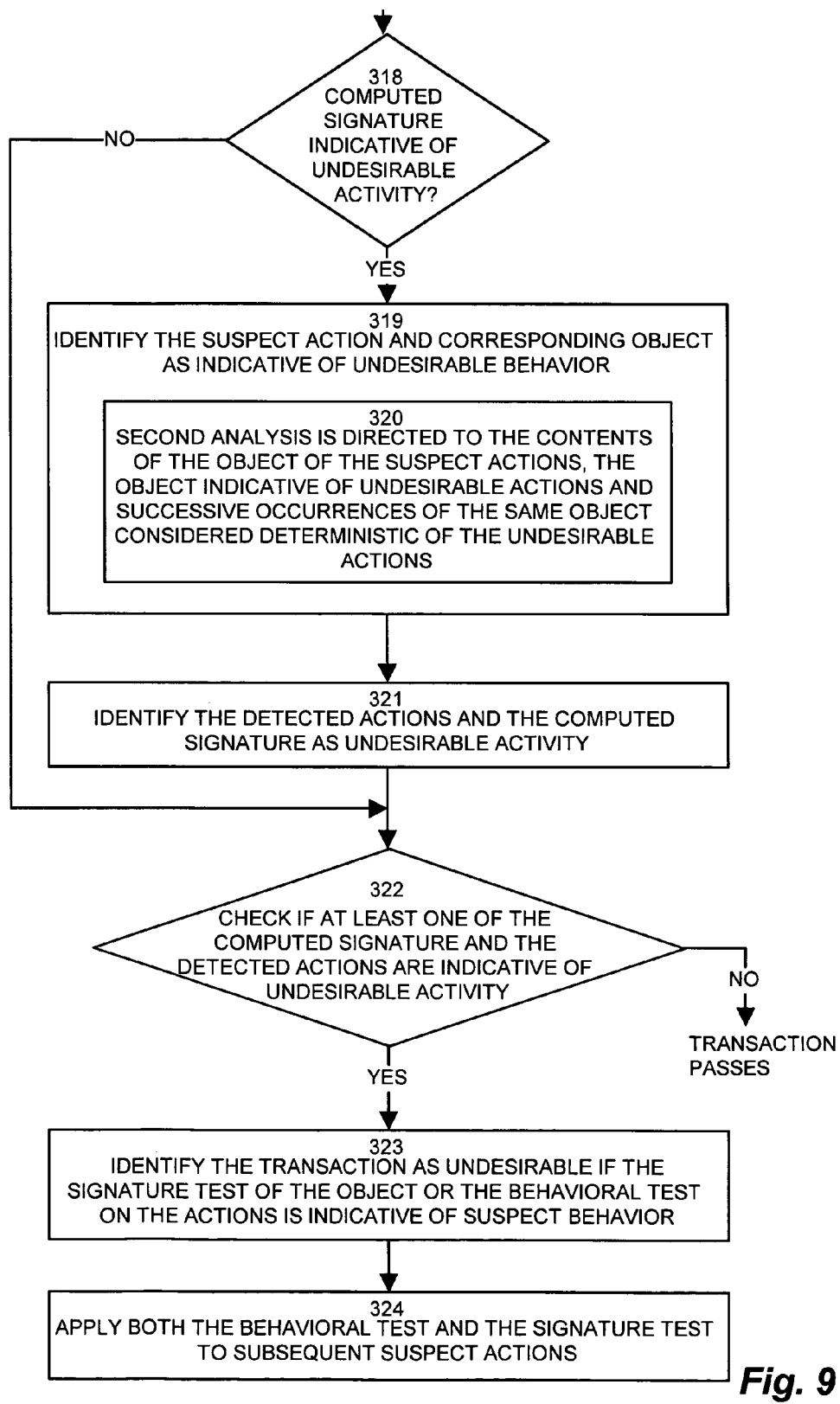

FIG. 5 is a block diagram of the security agent 110 in the environment of FIG. 1. Referring to FIG. 5, the host 120, typically a user computer or PC on the LAN 140, includes the security agent 110, among other processes and threads (not specifically shown) included in the host 120. The behavior heuristic 112 is stored as a set of rules in a behavioral monitor 116. The security agent 110 also includes an object comparator 118 having a scanner/extractor 124 for parsing objects such as files and delivering byte sequences to the signature generator 114 for computing a signature or hash. A local AV service 122 is operable to store and manipulating the signatures locally, rather than invoking the AV server 150, as will be discussed further below.

The host 120 also connects to a repository 172, via the master console 170, for accessing a set of rules 174 and a set of realtime signatures 176. The rules codify the behavioral heuristics 112 in a form suitable for processing. The behavioral monitor 116 employs the rules 174 specifying the behavior heuristics 112, and the pattern matcher 118 accesses the realtime signatures 176 from the signature generator 114, which are indicative of previous undesirable communications. The AV server 150 provides conventional signature matching from a vendor updated AV database 152. Further, the AV database includes a signature table 154 for integrating the signatures from the signature generator 114 with the AV vendor supplied signatures, discussed further below.

FIGS. 6-9 are a flowchart for identifying undesirable transmissions by employing the security agent of FIG. 5. Referring to FIGS. 5-9, the security agent 110 identifies behavioral actions indicative of suspect behavior, as depicted at step 300. The set of behavioral actions are a behavior heuristic 112 of activity which, when performed by a subject process or thread, are indicative of undesirable activity. Typically, the suspect operations are indicative of malicious access attempts, as shown at step 301. More specifically, the suspicious actions are codified occurrences derived from common denominators of undesirable transmissions, such as viruses and worms. The security agent 110 receives the sets of behavioral actions from a rule database 174 in the repository 172, which maintains the behavior heuristic 112 for retrieval and update.

The security agent 110 detects actions performed with respect to a newly arrived or untrusted object, in which the operations are indicative of suspect behavior, as depicted at step 302. In the exemplary arrangement, the security agent 110 is configured to intercept and monitor a variety of subject (process or thread) actions, such as file accesses, I/O port accesses, and other security pertinent operations. Therefore, the security agent 110 is empowered to scrutinize relevant operations on the host node 120.

Accordingly, at a successive time during normal host uptime, the security agent identifies an operation including one or more actions directed toward an object by a subject, as shown at step 303. In response, the security agent 110 initiates performance of an integrated analysis of the identified action or actions in the operation, as shown at step 304, in which the integrated analysis includes at least a first analysis (subject behavioral based) and a second analysis (object content based), in which the first analysis further includes analyzing detected operations with the suspicious behavioral actions, as shown at step 305.

As indicated above, the first (behavioral) analysis is directed to the behavior heuristic applied to the behavior of the subject exhibited by the suspect actions, as depicted at step 306. It should be noted that the integrated detection approach, illustrated as encompassing the behavioral comparison matching first, followed by the signature comparison matching, is exemplary, and the ordering may be reversed or performed concurrently in alternate configurations.

The security agent 110 performs a check to determine if the behavior heuristic 112 identifies a correspondence to the detected actions, and therefore are indicative of undesirable activity, as depicted at step 307. If so, then the security agent 110 identifies the detected actions as undesirable activity, as depicted at step 308. Identification of the type of analysis (i.e. behavioral or signature check), which flagged the suspect activity as undesirable is performed to enable successive correlation of all such checks, of which the behavioral and signature checks are illustrated herein, however alternate arrangements may perform other or additional checks.

From the identified transaction (actions and object), the signature generator 114 computes a signature indicative of the object or entity (e.g. file) which is the medium of conveyance of the detected undesirable activity, in which the signature is computed from the associated object (e.g. infected email attachment) of the behavioral actions and operable to indicate subsequent undesirable activity, as shown at step 309. Since the actions indicate undesirable activity, then as indicated above, the same or similar object appearing elsewhere is likely indicative of the same virus or undesirable transmission. The security agent 110 computes the signature in response to the positive behavioral analysis check, therefore the computed signature is triggered automatically. Accordingly, it is desirable to generate the signature in realtime or at least near real time, to avoid suspending the security agent 110 throughput and thus allow subsequent transactions to avoid the day zero phenomenon and benefit from identification of the newly discovered object 152. Therefore, the signature is an identifier such as a hash, i.e. MD4, MD5, or SHA to name several known in the art, which are rapidly computable as an automated response. Other identifiers may be employed, such as other hashes or computations which are smaller than the entity they represent yet highly unlikely to be duplicated by a dissimilar entity.

The security agent 110 attempts to aggregate the hash signatures obtained as a result of the behavioral checks. Accordingly, the security agent 110 adds the computed signature to the previously computed signatures, as depicted at step 310. In further detail, in the exemplary configuration, the security agent 110 accumulates the computed signature (e.g. hash) as a set of signatures 176 indicative of undesirable activity, as depicted at step 311. The security agent 110, therefore, accumulates the computed signatures to build a set of determined signatures 176, in which the set of determined signatures is adapted for comparison with objects 152 of subsequent suspect operations.

In the exemplary configuration, the security agent 110 employs a realtime signature set 176 in a repository 172. Accordingly, generation of the hash signature further comprises storing the computed signature in the repository 172 operable to store signatures indicative of undesirable activity for comparison with successive actions, as shown at step 312.

The claimed integrated security mechanism, illustrated herein as the exemplary integrated behavioral (subject action based) and signature (object content based) method, employs the signature generation following a positive behavioral check to rapidly identify (flag) the undesirable object for use with future suspect transmissions. Accordingly, generation and categorization of the hash corresponding to the culpable object may occur according to several suitable methods. In the particular exemplary arrangement illustrated, the repository 172 is an A/V database operable to store the signature set 176 as a tuple 176A, 176B in a realtime signature file 176 or table, including the signature 176A along with a corresponding signature computation method 176B, as depicted at step 313.

The signature computation method 176B allows signatures 176A from multiple sources to be stored together, since the computation method 176B identifies the manner in which the signature was computed to allow the same computation method to be applied to successive objects. Therefore, maintaining the signature set may include merging the set of signatures with an external signature set (table) 154, such as an A/V vendor database 152, which is also indicative of undesirable activity, in which the merged set operable as a uniform repository of signatures 176A, as shown at step 314. Accordingly, the accumulation of signatures may further include integrating the computed signatures with an external AV database 152, in which the AV database 152 is operable to store signatures computed via a plurality of computational methods, as indicated by the computation method 176B field, as depicted at step 315.

As indicated above, the realtime signature set 176 includes signatures generated responsively to behavioral indications of undesirable transactions 132, which are computed in realtime or at least near real time. Accordingly, a hash operation is particularly applicable, however alternate signature mechanisms may me employed. The external AV database 152, such as that provided by an AV vendor, may include signatures resulting from more complex computations. For example, the set of signatures 154 may include signatures generated from predetermined mathematical computations on at least a portion of the object, and the external signature set includes signatures generated from positional range and value determinations of predetermined patterns in an object, as depicted at step 316. Such range/value signatures illustratively shown in the AV DB 152 signature table 154 may therefore merge with the hash based signatures 176A in the repository 172. Other signature generation, storage, and manipulation will be apparent to those of skill in the art.

If the behavioral analysis examined at step 307 is not indicative of an undesirable transaction, then the security agent 110 invokes the pattern matcher 118 for analysis of the object of the transaction according to the realtime signatures 176 in the repository 172, the generation and maintenance of which has just been described above with respect to steps 312-316. The pattern matcher compares the computed signature with the previously computed signatures indicative of undesirable activity, as depicted at step 317. The security agent 110 performs a check to determine if the computed signature is indicative of undesirable activity, as shown at step 318. Typically, such a comparison involves computing a hash on the incoming object, and comparing the hash to the previously generated realtime signatures 176A in the repository. As indicated above, the realtime hash in response to passing the behavior check is an efficient comparison mechanism to determine if the incoming object has previously been associated with an undesirable transaction based on the behavior check at step 307. Alternate signature generation mechanisms may be employed.

Based on the check at step 318, the security agent identifies the detected operations and the computed signature as undesirable activity, as shown at step 319. Therefore, the signature, or second analysis, is directed to the contents of the object of the suspect actions, in which the object is indicative of undesirable actions and successive occurrences of the same object considered deterministic of the undesirable actions, as depicted at step 320. The signatures obtained (accumulated) from the behavioral checks, above, define the realtime signature database 176 of objects corresponding to such undesirable behavior. For example, a virus attack typically involves a sequence of actions to store and activate the virus and the actual virus file. The hash is computed from the virus file to yield the signature once the sequence of actions to store and activate the virus trigger the behavior check. Subsequent occurrences of the same virus file then trigger the signature 176A check, and yield a positive hash comparison result. Note that successive occurrences of the same sequence of actions would likely trigger the behavior check as well, illustrating the multi pronged approach of the integrated behavioral and signature check.

Accordingly, the security agent 110 identifies the computed signature as undesirable activity, as depicted at step 321. Following identification of the current object as undesirable activity, or from the check at step 318 if the computed signature is not indicative of undesirable activity, the security agent 110 performs a check to determine if at least one of the computed signature and the detected actions are indicative of undesirable activity, as depicted at step 322. If so, then the security agent identifying the transaction 132 as undesirable if the signature test of the object at step 318 or the behavioral test on the actions at step 307 is indicative of suspect behavior, as depicted at step 323. Otherwise, the transaction 132 is allowed to pass.

Figure 10:
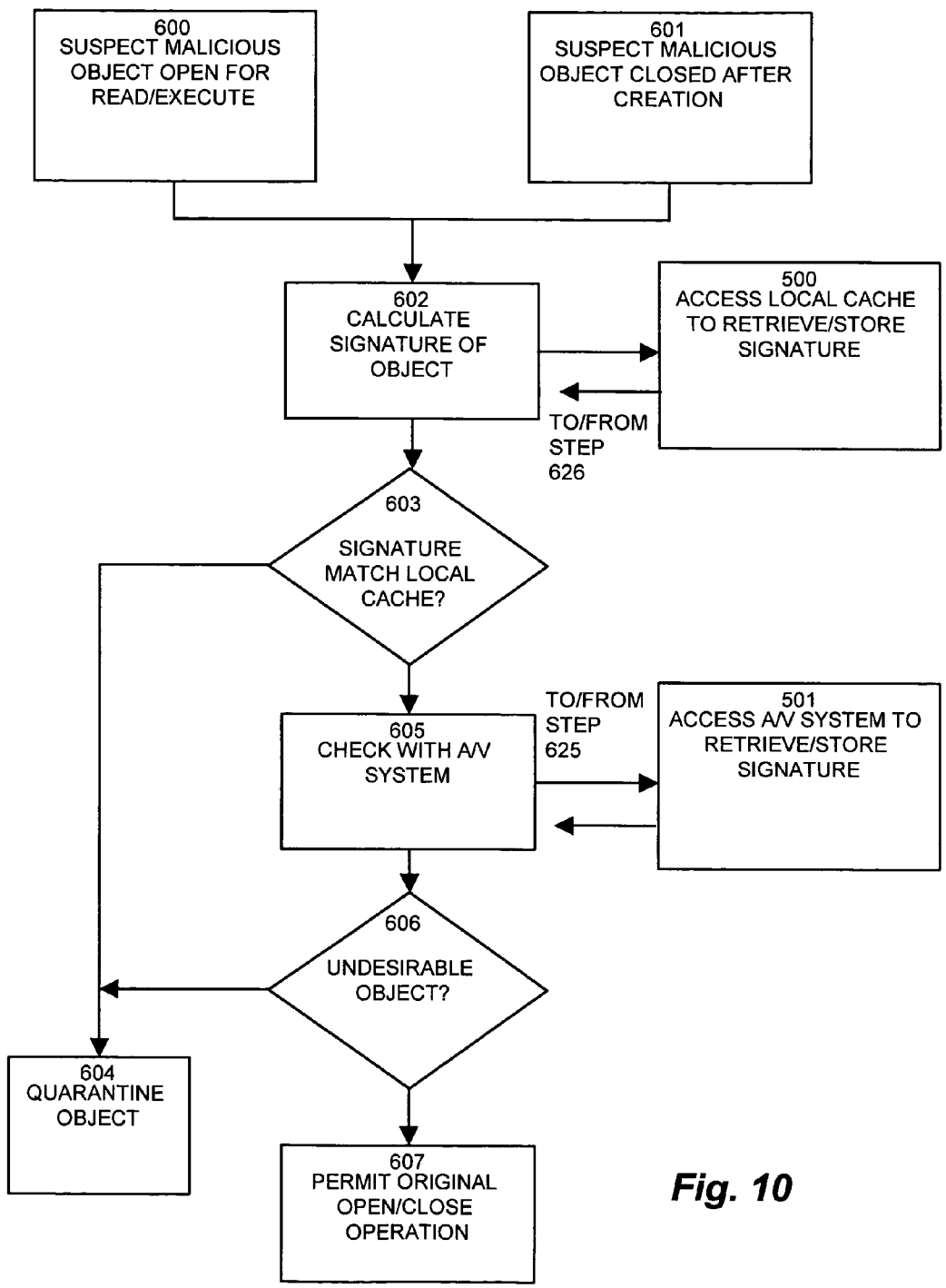
FIGS. 10 and 11 are a flowchart of the integrated behavioral and signature checks in greater detail.
Figure 11:
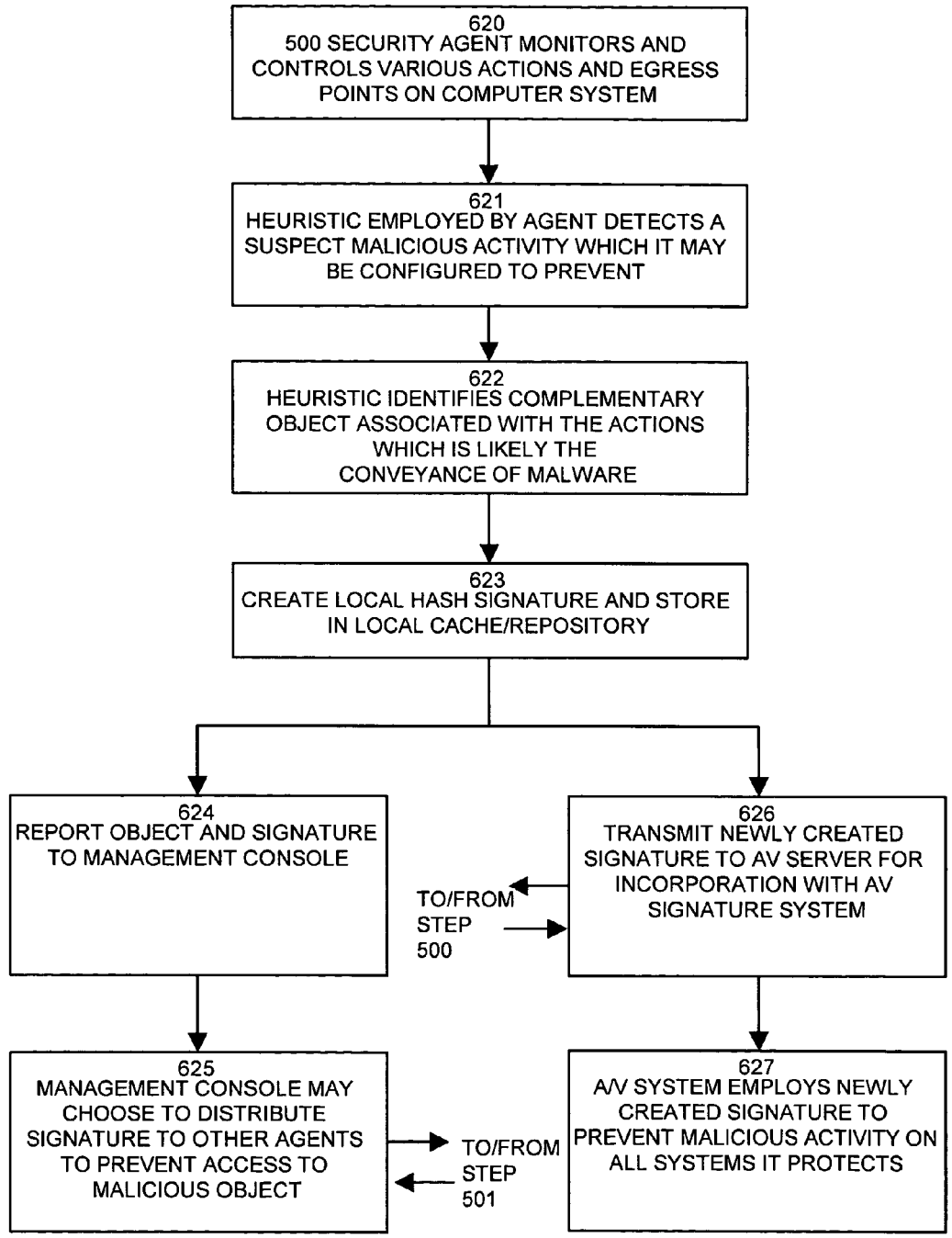

FIGS. 10 and 11 are flowcharts of the integrated behavioral and signature checks in greater detail. FIG. 10 depicts the signature check, which generally occurs immediately upon introduction of a new entity (e.g. file or object) into the environment 100. FIG. 11 depicts the behavioral monitoring and prevention, which occurs as an ongoing monitoring effort by the behavioral monitor 116 according to the behavioral heuristic 112. The local repository, or cache 172, and the remote A/V server 150 are employed by both for reading and/or writing signatures, as will now be discussed in further detail with respect to FIGS. 10 and 11.

Referring to FIGS. 5 and 10, the signature check is initiated following detection of a suspect malicious object open for read/execute, as depicted at step 600, or detection of a suspect malicious object closed after creation, as depicted at step 601. Detection may occur by the security agent 110 or, alternatively, by the A/V server 150, depending on which entity is charged with signature based detection. Following such detection, the signature generator 114 calculates a signature of the alleged malware object, as shown at step 602. The object comparator 118 compares the signature to the known malware signatures in the realtime signature repository 176, and accordingly accesses the local cache (repository) 172, as depicted at step 500.

The object comparator 118 performs a check, at step 603, to determine if a matching malware signature is found in the local signature repository 172, and if so, quarantines the object, as depicted at step 604. If the check at step 603 does not detect malware, then the security agent 110 checks with the external A/V server 150, as depicted at step 605. Accordingly, the security agent 110 accesses the A/V server 150, as depicted at step 501, and performs a check to determine the presence of an undesirable malware object, as shown at step 606. If the check indicates the presence of malware, then the object is quarantined, as shown at step 604, otherwise the security agent 110 permits the original open/close operation, as depicted at step 607.

Referring to FIGS. 5 and 11, in the managed information environment 100, the security agent 110 monitors and controls various actions and egress points on the hosting computer system in an ongoing manner, as depicted at step 620. The behavioral heuristic 112 employed by the security agent 110 detects a suspect malicious activity which it may be configured to prevent, as shown at step 621. As indicated above, the security agent 110 employs the heuristic 112 in an ongoing manner, in which "untrusted" objects and "suspect" activities are observed and inherited by other processes and objects which interact. At some point, the heuristic 112 identifies a complementary object associated with the actions which is likely the conveyance of malware, as depicted at step 622. Such an object may be, for example, a file containing an email attachment which is called on for execution. Accordingly, the security agent 110 creates the local hash signature and stores the signature in the local cache/repository 176, as shown at step 623, therefore enabling a signature based (immediate) prevention mechanism against subsequent occurrences of the malware on this or other computers.

Following the behavioral heuristic 112 based detection, the security agent 110 performs both a local notification and an external A/V server 150 notification to disseminate information on the newly discovered malware. The security agent 110 reports the malware object and signature to management console 170, as depicted at step 614. The management console 170 may choose to distribute the signature to other agents 110 to prevent access to the malicious object and therefore prevent propagation of undesirable effects of the malware object, as depicted at step 625. Propagation includes accessing the local repository 172, as depicted at step 500, illustrating the integration of the behavioral and signature checks. Several propagation mediums, described above, are employable for propagating the signature, generally entailing making the contents of the realtime signature repository 176 available to other security agents.

The security agent 110 also transmits the newly created signature to the AV server 150 for incorporation with AV signature system, as depicted at step 626. Such integration involves accessing the AV server 150, as shown at step 501, making the signature available to the signature check outlined above. Other A/V system then employ newly created signature to prevent malicious activity on all systems it protects, as shown at step 627.

In this manner, the integrated approach applies both the behavioral heuristic 112 and the signature test to suspect incoming transactions, and identifies the transaction as undesirable activity if either indicates undesirable activity. In an ongoing manner, the security agent applies both the behavioral test and the signature test to subsequent suspect actions, as depicted at step 324, therefore strengthening the signature check with the newly added behavior heuristic detected malware.

In alternate configurations, a local AV server 122 provides the functionality of a vendor populated AV server 150, and is operable for integration with the repository 172. Such a local AV server 122 mitigates latency time for communicating with the AV server 150. Accordingly, the local AV 122 server provides a set of predetermined signatures similar to the signature table 154, while mitigating overhead for communicating with the AV server 150, or for handling end to end encryption links, as described above.

Those skilled in the art should readily appreciate that the programs and methods for detecting undesirable activity in an information processing environment as defined herein are deliverable to a processing device in many forms, including but not limited to a) information permanently stored on non-writeable storage media such as ROM devices, b) information alterably stored on writeable storage media such as floppy disks, magnetic tapes, CDs, RAM devices, and other magnetic and optical media, or c) information conveyed to a computer through communication media, for example using baseband signaling or broadband signaling techniques, as in an electronic network such as the Internet or telephone modem lines. The operations and methods may be implemented in a software executable object or as a set of instructions embedded in a carrier wave. Alternatively, the operations and methods disclosed herein may be embodied in whole or in part using hardware components, such as Application Specific Integrated Circuits (ASICs), state machines, controllers or other hardware components or devices, or a combination of hardware, software, and firmware components.

While the system and method for detecting undesirable activity in an information processing environment has been particularly shown and described with references to embodiments thereof, it will be understood by those skilled in the art that various changes in form and details may be made therein without departing from the scope of the invention encompassed by the appended claims. Accordingly, the present invention is not intended to be limited except by the following claims.

What is claimed is:

1. A method for preventing undesirable activity in an information processing environment comprising:
    developing a heuristic operable to identify suspect behavior in the information processing environment;
    employing the developed heuristic for identifying a corresponding malicious object as a conveyance of an undesirable result of the suspect behavior;
    creating a signature indicative of the identified malicious object, the signature computed from at least a portion of the malicious object and operable to indicate the malicious object;
    computing a signature on the potential malicious object;
    upon introduction of the malicious object, examining a repository of local quarantined signatures and comparing the computed signature with at least one of the signatures in the repository of local quarantined signatures and previously created signatures indicative of a malicious object such that subsequent propagation of the malicious object is prevented;
    wherein comparing the computed signature comprises at least one of examining a remote server based anti virus set, and a cached set of recently quarantined signatures via a master console;
    identifying a potential malicious object associated with the identified actions;
    detecting, via the heuristic, whether the identified actions are indicative of suspect behavior; and
    determining the existence of undesirable activity if either the heuristic indicates a correspondence with suspect behavior or the computed signature corresponds with the previously created signatures indicative of a malicious object.

2. The method of claim 1 further comprising detecting the correspondence of each of the heuristic and the computed signature occurs independently, wherein determining undesirable activity occurs upon the correspondence of either.

3. The method of claim 1 comprising accumulating a set of signatures indicative of undesirable activity, where the accumulating comprises at least one of:
    locally computing the signature and transmitting the signature to a repository of malicious signatures, transmitting an identifier and location of the malicious entity to a remote server for enabling retrieval of the malicious entity, and transmitting the entire malicious object to a remote server.

4. The method of claim 3 wherein accumulating the set of signatures further comprises:
computing the signature of the malicious object according to a predetermined sequence; and
integrating the computed signature with a repository of signatures of previously quarantined malicious entities.

5. The method of claim 4 further comprising merging the set of signatures with an external signature set also indicative of undesirable activity, the merged set operable as a uniform repository of signatures.

6. The method of claim 5 wherein the set of signatures includes signatures generated from predetermined mathematical computations on at least a portion of the malicious object, and the external signature set includes signatures generated from positional range and value determinations of predetermined patterns in an object.

7. The method of claim 1 further comprising:
accumulating the computed signatures to build a set of determined signatures, the set of determined signatures adapted for comparison with objects of subsequent suspect uses;
comparing a signature of objects of subsequent suspect uses with the set of determined signatures and employing the developed heuristic to subsequent suspect actions; and
identifying the transaction as undesirable if the signature of the object matches one of the set of determined signatures or the result of the developed heuristic on the actions is indicative of suspect behavior.

8. The method of claim 7 accumulating further comprises integrating the computed signatures with an external AV database, the AV database operable to store signatures computed via a plurality of computational methods.

9. The method of claim 8 further comprising storing the computed signature in a repository operable to store signatures indicative of undesirable activity for comparison with successive actions.

10. The method of claim 9 wherein the repository is an A/V database operable to store signatures and a corresponding signature computation method.

11. A system for preventing malicious access attempts comprising:
identifying an attempted operation, the attempted operation directed toward an object by a subject;
performing an integrated analysis of the identified operation, the integrated analysis including at least a first analysis and a second analysis, the first analysis further including:
employing a heuristic to determine if actions of the subject on the object correspond to malicious access attempts;
designating, based on the determination, suspect actions as undesirable actions;
computing a signature corresponding to the object of the suspect actions, the signature indicative of the object of the undesirable actions; and
accumulating the computed signatures in an undesirable signature repository indicative of objects associated with undesirable actions;
the second analysis further including:
computing a signature on the object of the suspect actions;
comparing the computed signature to the undesirable signature repository; and
designating, if a match is found in the undesirable signature repository, the object as undesirable;
concluding the suspect actions as an undesirable transaction if either the first analysis or the second analysis result in the suspect actions on the object being designated as undesirable; and
rejecting the undesirable transaction.

12. The method of claim 11 wherein the first analysis is directed to the behavior of the subject exhibited by the suspect actions.

13. The method of claim 11 wherein the second analysis is directed to the contents of the object of the suspect actions, the object indicative of undesirable actions and successive occurrences of the same object considered deterministic of the undesirable actions.

14. An agent operable in a data communications device for preventing undesirable activity in an information processing environment comprising:
an interface operable to receive communications destined for the data communications device, the agent operable to examine the communications for suspect behavior;
a behavioral monitor in the agent operable to observe actions indicative of suspect behavior;
at least one behavior heuristic operable to identify suspect behavior in the information processing environment, the agent operable to identify, if the detected actions correspond to the suspect behavioral actions, a corresponding malicious object as the conveyance of the undesirable result of the detected actions;
a signature generator in the agent operable to compute a signature, the signature computed from the corresponding malicious object and operable to indicate the malicious object; and
wherein the agent is operable to:
accumulate the computed signatures to build a set of determined signatures, the set of determined signatures adapted for comparison with objects of subsequent suspect actions;
apply both the signature test and the behavioral test to subsequent suspect actions; and
identify the transaction as undesirable if the signature test of the object or the behavioral test on the actions is indicative of suspect behavior.

15. The agent of claim 14 wherein the security agent is further operable to:
detect actions performed on a subsequent object, the actions indicative of suspect behavior, further comprising
a pattern matcher operable to compare a signature computed on the subsequent object with the previously computed signatures indicative of undesirable activity;
a behavioral monitor operable to employ the behavior heuristic operable for analyzing, if the computed signature is not indicative of undesirable activity, the detected actions with suspect behavior, the behavioral monitor further operable to identify, if at least one of the computed signature and the detected actions are indicative of undesirable activity, the detected actions and the computed signature as indicative of undesirable activity; and
a signature database operable to receive the computed signature for storing with the previously computed signatures.

16. The agent of claim 14 wherein the database is further operable to accumulate the computed signature as a set of signatures indicative of undesirable activity.

17. The agent of claim 16 further comprising an external signature set also indicative of undesirable activity, the merged set being accessible to the security agent for merging the set of signatures as a uniform repository of signatures.

18. The agent of claim 17 wherein the set of signatures includes signatures generated from predetermined mathematical computations on at least a portion of the object, and the external signature set includes signatures generated from positional range and value determinations of predetermined patterns in an object.

19. The agent of claim 14 further comprising an external AV database, the AV database operable to store signatures computed via a plurality of computational methods.

20. The agent of claim 14 further comprising a repository operable to store computed signatures indicative of undesirable activity for comparison with successive actions.

21. The agent of claim 20 wherein the repository is an A/V database operable to store signatures and a corresponding signature computation method.

22. A system for multi-tiered integration of detection of undesirable computing activity comprising:
an agent operable to identify a transaction and identify subjects and objects associated with the transaction;
a heuristic responsive to the agent for identifying actions of the subject corresponding to known undesirable actions;
a signature repository operable to receive and store signatures of known undesirable objects from at least a portion of the undesirable object; and
a signature generator operable to generate a signature indicative of an undesirable object from at least a portion of the undesirable object, the agent further operable to employ the heuristic toward the identified subject for identifying undesirable actions and operable to employ the signature generator to generate a signature and compare the generated signature with the signatures in the signature repository for identifying undesirable objects, the signature repository receiving the generated signatures of objects associated with subjects identified as performing undesirable actions.

23. A computer program product having a tangible computer readable medium operable to store computer program logic embodied in computer program code encoded thereon for preventing undesirable activity in an information processing environment comprising:
computer program code for developing a heuristic operable to identify suspect behavior in the information processing environment;
computer program code for employing the developed heuristic for identifying a corresponding malicious object a conveyance of an undesirable result of the suspect behavior; and
computer program code for creating a signature indicative of the identified malicious object, the signature computed from at least a portion of the malicious object and operable to indicate successive appearances of the malicious object;
computer program code for computing a signature on the potential malicious object;
computer program code for comparing the computed signature with at least one of the previously created signatures indicative of a malicious object;
computer program code for identifying a potential malicious object associated with the identified actions;
computer program code for detecting, via the heuristic, whether the identified actions are indicative of suspect behavior; and
computer program code for determining the existence of undesirable activity if either the heuristic indicates a correspondence with suspect behavior or the computed signature corresponds with the previously created signatures indicative of a malicious object.

24. A method for preventing undesirable activity within a computer system, the method comprising:
maintaining behavioral actions indicative of suspect behavior;
detecting a set of actions that are attempted to be performed by a suspect process on an object within the computer system during action of the suspect process, the actions matching the behavioral actions indicative of suspect behavior;
in response to detecting the actions performed by the suspect process on the subsequent object that correspond to the behavioral actions, inferring that the suspect process is performing undesirable activity within the computer system;
preventing the suspect process from further performing the sequence of actions;
creating a signature of the suspected process, in real time; and
disseminating this signature to security agents operating on other computer systems to prevent the malicious process from operating on other machines without requiring those other machines to detect the sequence of actions corresponding to the behavioral actions indicative of suspect behavior.

* * * * *